United States Patent [19]

Clary et al.

[11] Patent Number: 5,260,538

[45] Date of Patent: Nov. 9, 1993

[54] DEVICE FOR THE MAGNETIC INDUCTIVE HEATING OF VESSELS

[75] Inventors: David W. Clary; Andrew O. Wikman, both of Baton Rouge, La.

[73] Assignee: Ethyl Corporation, Richmond, Va.

[21] Appl. No.: 865,972

[22] Filed: Apr. 9, 1992

[51] Int. Cl.$^5$ ............................................. H05B 6/02
[52] U.S. Cl. ........................... 219/10.491; 219/10.75; 219/10.79; 219/6.5; 373/157; 423/349; 422/146; 427/213
[58] Field of Search ................. 219/10.491, 10.75, 6.5, 219/10.79; 373/138, 151, 152, 155, 156, 157; 118/725; 423/349; 422/146; 427/213

[56] References Cited

U.S. PATENT DOCUMENTS

| | | | |
|---|---|---|---|
| 3,012,862 | 12/1961 | Bertrand et al. | 23/223.5 |
| 4,424,199 | 1/1984 | Iya | 423/349 |
| 4,784,840 | 11/1988 | Gautreaux et al. | 423/349 |
| 4,906,441 | 3/1990 | Flagella | 422/146 |
| 4,992,245 | 2/1991 | Van Slooter et al. | 422/146 |
| 5,041,308 | 8/1991 | Kuramoto | 427/213 |

FOREIGN PATENT DOCUMENTS 533426 12/1921 France .
2214092 8/1974 France .
2303599 10/1976 France .

OTHER PUBLICATIONS

Orfeuil, *Electric Process Heating, Technologies/Equipment/Applications*, "Chapter 6: Electromagnetic Induction Heating", Bartelle Press.
Simpson, *Induction Heating-Coil and System Design*, McGraw-Hill Book Co., Inc., 1960.
Stansel, *Induction Heating*, McGraw-Hill Book Co., Inc., First Edition, 1949.

*Primary Examiner*—Bruce A. Reynolds
*Assistant Examiner*—Tu Hoang
*Attorney, Agent, or Firm*—Edgar E. Spielman, Jr.; Patricia J. Hogan

[57] ABSTRACT

The inductive heating of a reactor vessel by an external electromagnetic heating source is made more uniform by placing a susceptor between the heating source and the reactor vessel. In preferred embodiments, the reactor vessel is a fluidized bed vessel made of graphite and suitable for the preparation or treatment of polysilicon particles, and the susceptor is also made of graphite.

10 Claims, 1 Drawing Sheet

DEVICE FOR THE MAGNETIC INDUCTIVE HEATING OF VESSELS

BACKGROUND OF THE INVENTION

Electromagnetic induction heating methods have been used in reaction vessels in a number of industrial applications. These applications include methods related to manufacturing and treating granular polysilicon in fluidized bed reactors. Examples of these uses include the following references.

*Induction Heating Coil and System Design*, P. G. Simpson, McGraw-Hill Book Company, Inc., New York, 1960 and *Induction Heating*, N. R. Stansel, 1st Edition, McGraw-Hill Book Company, Inc., 1949 disclose general techniques and materials for induction heating.

Iya (U.S. Pat. No. 4,424,199) demonstrates the use of a fluidized bed reactor along with a method for generating fine sized particles to be used in such a reactor.

Gautreaux et al. (U.S. Pat. No. 4,784,840) teaches a method of utilizing a fluidized bed reactor to create polysilicon particles having reduced surface dust. In this method, a first mode creates polysilicon particles by the decomposition of silane, then a second mode decomposes a lower concentration of silane to form an encapsulating layer around the original particle.

Kuramoto (U.S. Pat. No. 5,041,308) discloses an apparatus for heating polycrystalline silicon, in which the silicon is placed in a reaction vessel which is heated by an outside means. This reaction vessel has an inner liner formed of graphite coated with highly pure silicon having a thickness of 100 microns or more.

THE INVENTION

The present invention generally provides a method and apparatus to more efficiently heat a reactor vessel utilizing inductive heating. This method and apparatus may be beneficial in any system utilizing an inductive heating means such as a free-space reactor, but is preferred to be used in a bed reactor. For the purposes of this application, a free-space reactor is a reactor containing an open space in which depositions may be made upon a surface. Examples of such a free-space reactor would be any chemical vapor deposition reactor. A bed reactor may comprise a fluidized bed reactor, moving bed reactor or stationary bed reactor.

More specifically, the present invention provides a method and apparatus for more evenly heating a reactor vessel while using electromagnetic inductive heating.

Electromagnetic inductive heating methods are well known in the prior art. Of particular noteworthiness is their use in bed reactors, such as fluidized bed reactors which are utilized in the production of particulate polysilicon. In such instances, the structure of the bed reactor and the method used to heat it is relatively simple. An external electromagnetic inductive heating means, such as a coil of copper wires through which electricity may be passed, is used in conjunction with the inner wall structure, hereinafter referred to as the reactor vessel or wall of the reactor vessel (or similar term). Electricity is passed through the coiled wire and the resulting electromagnetic field generates eddy currents in the wall of the reactor vessel. The resistance of the reactor wall to these induced currents creates heat which serves to heat the inner chamber of the reaction vessel. A means of insulating the reaction vessel is often used. An insulating means which does not adversely affect the electromagnetic field may be placed between the electromagnetic heating means and the inner wall of the reactor vessel.

Such methods provide adequate heating for reaction vessels, but have been noted to have drawbacks due to unevenness of heating. Areas of the containing structure have been found to have significant differences in temperature from neighboring areas. Under the stresses of temperature gradients, gas pressure, axial compression and pounding from solids in the reactor, weaknesses may form in the material comprising the vessel wall. Such weaknesses lead to a reduced reactor life and the resulting down time and expense of rebuilding the reactor.

In a preferred embodiment of the present invention, an external susceptor is placed between the external electromagnetic inductive heating device and the reaction vessel wall. For the purposes of the present invention, the term external susceptor shall refer to an additional shell which is similar to and surrounds the reactor vessel. It is preferred that the external susceptor be made of the same material, or a similar material, as that which comprises the reactor vessel. It is more preferred that the external susceptor be separated from the internal containing structure by a space.

In the case of a fluidized bed reactor used to produce or treat polysilicon particles, it is preferred that the reactor wall and external susceptor be comprised of graphite or a similar material. The external susceptor may vary in thickness, depending upon its desired use. The external susceptor may have the same or a different thickness than that of the reactor wall. It is also more preferred that the external susceptor be separated from the reactor wall by a space. When graphite is utilized in processes manufacturing or treating polysilicon particles, it is preferred that the graphite used in the reactor wall have similar thermal expansion qualities as those of silicon and silicon carbide. silicon on or silicon carbide, or both, may be used to create a non-contaminating inner lining in a bed reactor used to treat or manufacture particulate polysilicon. The graphite's desired similarity of thermal expansion qualities with that of these compounds allows an inner lining which will not readily be removed under the conditions of standard reactor use.

The graphite comprising the external susceptor need not have the same thermal expansion qualities as the reactor wall. The external susceptor does not encounter the gas pressure or product contact seen by the inner wall. Therefore, a different grade of graphite which does not correspond to the expansion qualities of the non-contaminating lining may be used. A larger-grained, and therefore coarser, graphite than that generally acceptable for the inner reactor wall may be acceptable for the external susceptor. In addition, the graphite used in the external susceptor may be porous, as it does not require the containment qualities of the reactors inner walls. One skilled in the art would readily determine the grade of graphite desired depending upon the conditions and stresses of a particular application. For the treatment of high purity polysilicon, or other high temperature industrial uses, a grade of graphite capable of withstanding the stresses of wide temperature gradients is highly preferred. It has been found that coarser-grained graphite works well for this purpose, though others may be used.

The use of the external susceptor appears to produce a more uniform heating of the internal reactor wall. As is known in the art of induction heating, the external structure, or external portion of a single, solid structure, absorbs the majority of the inductive energy. In the case of the present invention, the external susceptor means would absorb this majority of energy. If an insulating means is placed to the outside of the external susceptor, the resulting heat is directed toward the reactor wall. This heating, along with the inductive heating which occurs within the reactor wall, itself creates a more uniform heating of the walls of the inner wall.

This evenness of heating also appears to increase the longevity of the internal reactor wall. In prior methods, the materials comprising the reactor vessel were subjected to varying stresses while under differing temperatures. Under such conditions, the life of the reactor vessel was less than desired. It is assumed that the differences in the expansion qualities of these materials under such temperatures created strains which led to structural damage and a shorter lifetime of use.

These and other features of this invention can be more fully appreciated in view of the following description of the accompanying drawing in which FIG. 1 is a simplified vertical sectional view of a reactor utilizing an external susceptor and electromagnetic inductor of the invention.

DESCRIPTION OF THE DRAWING

It is understood that the present invention may take many forms in induction-heated reactors and that the present drawing is in no way intended to limit the scope of the present invention.

The drawing provided illustrates a cross-sectional view of a standard bed reactor. Gases flow upward from an area below the lower portions of the drawing and exit through conventional means located above the portions depicted in the drawing. Generally, solids treated in the reactor vessel are added through means which are also located above the portions indicated in the drawing. The reactor vessel has an open reaction chamber (A) in which the desired reactions and/or treatments occur. This chamber is enclosed by the above-mentioned reactor wall (B).

Figure 1:
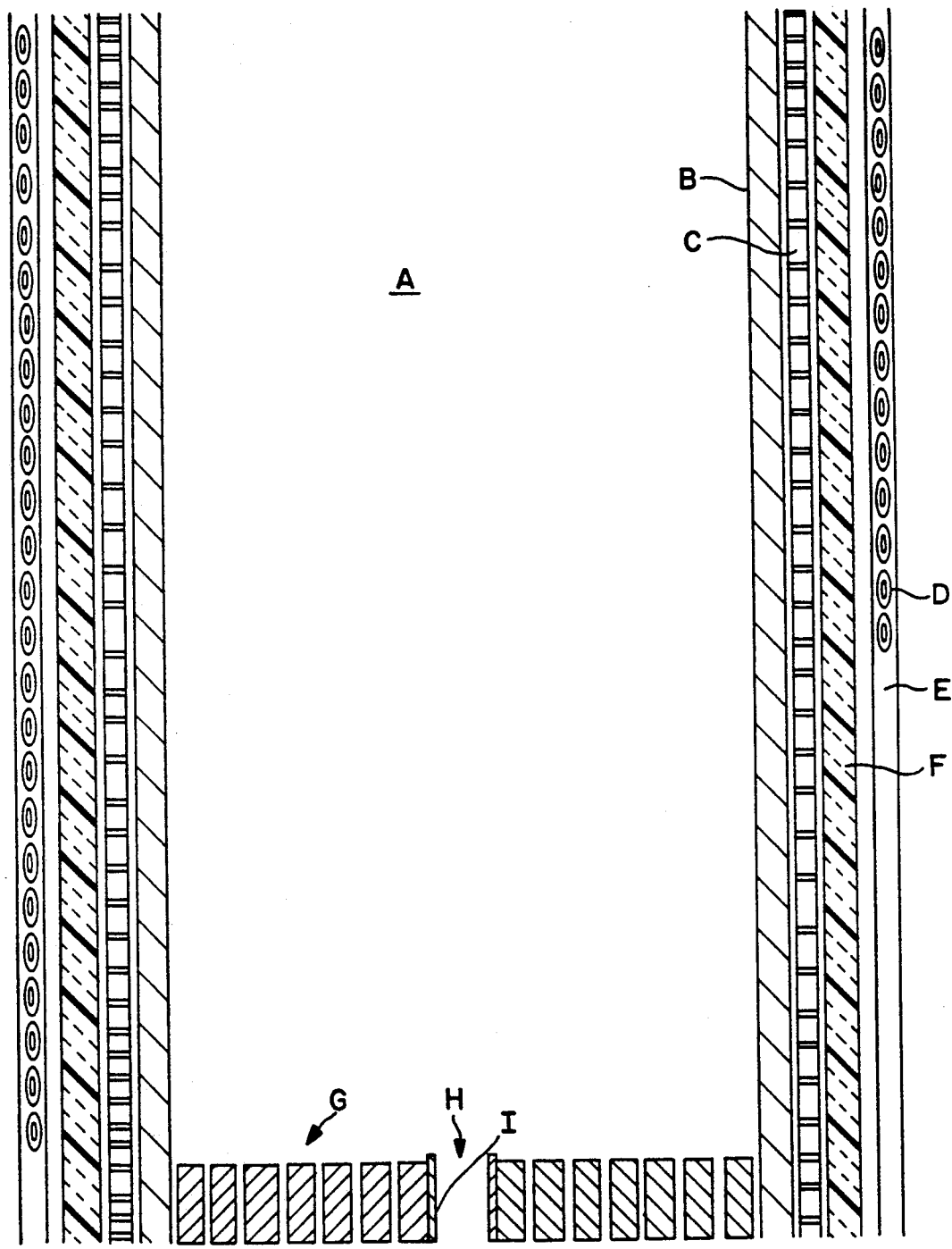

As previously mentioned, it is quite advantageous in many commercial applications to utilize a reactor vessel which is comprised of graphite. In reaction vessels dealing with certain high-purity materials, it is preferred that this vessel has an internal surface which comprises a material which is non-contaminating to the high-purity material. In the case of vessels dealing with particulate polysilicon, it is preferred that this non-contaminating material be silicon, silicon carbide, or a combination of the two. It is useful to have an internal surface in which the graphite vessel is covered by a layer of silicon carbide, which is in turn covered by a layer of polysilicon. The cumulative thickness of these protective layers may vary depending upon their desired lifetime of use, but is preferably at least between about 4 and 20 mils in thickness. As also previously mentioned, it is desirable to have a reactor vessel which is comprised of a grade of graphite which has thermal expansion qualities similar to those of silicon and silicon carbide. It is possible that the internal vessel wall could be made of additional materials. Some metals would be functional, especially in reactors operating at lower temperature ranges. Graphite is the preferred material for many industrial uses in large part because of its adaptability to both low and high temperature uses.

The external susceptor means (C) can be seen in the drawing to the outside of the reactor vessel. It is preferred that the external susceptor be separated from the reactor vessel by a space. This space is believed to be advantageous in providing a uniform heating of the reactor wall and, thus, the reactor's inner chamber. As previously mentioned, the external susceptor may be of a thickness which is the same or different from that of the inner reactor wall. One skilled in the art would readily ascertain the desired thickness based upon the fraction of inductive power the external susceptor is to absorb from the electromagnetic field created in each case.

An insulating means (F) is seen located between the external susceptor (C) and the means (E) which contains the inductive heating coils (D). As with the special relationship between the reactor vessel and the external susceptor, it is preferred that a space be provided between the external susceptor and the insulating means. Likewise, a space is preferred between the inductive heating means and the insulating means. This space provides not only for the uniformity of heat transfer, but also allows the space surrounding the reactor vessel to be filled with a non-contaminating gas. By surrounding the internal reaction chamber with such an atmosphere, the potential for contamination of the product being treated is lessened. Only non-contaminating gases would enter the reaction chamber should cracks or pores form in the reactor vessel wall. It is also preferred that the insulation used be such that it will not become friable in the presence of the non-contaminating gas and temperatures used. In the case of polysilicon treatment or manufacture, examples of non-contaminating gas would be argon or hydrogen.

The materials used as the insulating means (F) may be any of the commercially available insulations capable of performing at the desired reaction temperatures, but a rigid insulation is preferred for its convenience of handling. In many cases, it is preferred that the insulation not be comprised of a fibrous, particulate or otherwise dissociable material. Such a material may become borne by the non-contaminating gases surrounding the containing structure. If a break in the inner reactor vessel wall were to occur, these portions of insulating material could serve as contaminants to the product in the internal reaction chamber.

The induction heating means (D&E) may be any of the commercially available means which function to heat the reaction chamber to the desired temperatures. For processes manufacturing or treating polysilicon particles, it is preferred that the reactor be capable of producing and maintaining temperatures in the range of about 550° C. to about 1300° C. This includes temperatures of between about 580° C. and about 630° C. for the decomposition of silane, as well as higher temperatures such as about 1000° C. to about 1200° C., or higher, for the dehydrogenation of polysilicon particles. In general, the induction heating means may use a standard range of electric power, such as between about 1000 and about 3000 Hz, but this range is not intended to be limiting.

The lower portions of the drawing indicate a standard means of fluidizing a reaction bed and a means of removing the manufactured or treated product. A distributor means (G) distributes a flow of gas from below such that a moving or fluidized bed may be maintained.

Such means are well known in the art and may be adjusted by one so skilled to meet the particular needs of the reaction bed. Similarly, the product withdrawal tube (H) provides a means of removing the manufactured or treated product from the reaction chamber. It is preferred that the product withdrawal tube (H), like the inner wall of the reactor (B), have a surface (I) which is non-contaminating to the product found in the reaction vessel.

What is claimed is:

1. In an apparatus comprising a graphite reactor vessel and external electrogmagnetic inductive heating means, the improvement which comprises additionally having a graphite susceptor between the inductive heating means and the reactor vessel.

2. The apparatus of claim 1 having insulating means between the inductive heating means and the graphite susceptor.

3. The apparatus of claim 1 wherein the reactor vessel is a fluidized bed reactor vessel.

4. In an apparatus comprising a graphite fluidized bed reactor vessel external electromagnetic inductive heating means, the improvement which comprises additionally having (1) a graphite susceptor between the inductive heating means and the reactor vessel and (2) insulating means between the inductive heating means and the graphite susceptor.

5. The apparatus of claim 4 wherein the graphite fluidized bed reactor vessel is one suitable for the dehydrogenation of polysilicon particles.

6. The apparatus of claim 4 wherein the graphite fluidized bed reactor vessel is one suitable for the production of polysilicon.

7. In a method of heating a graphite reactor vessel by the use of an electromagnetic inductive heating means which is external to the reactor vessel and separated therefrom by insulating means, the improvement which comprises heating the reactor more evenly by utilizing a graphite susceptor between the insulating means and the reactor vessel.

8. The method of claim 7 wherein the reactor vessel is a fluidized bed reactor vessel.

9. The method of claim 8 wherein the reactor vessel is a fluidized bed reactor vessel suitable for the dehydrogenation of polysilicon particles.

10. The method of claim 8 wherein the reactor vessel is a fluidized bed reactor vessel suitable for the production of polysilicon.

* * * * *